United States Patent [19]

Watanabe et al.

[11] 4,259,935

[45] Apr. 7, 1981

[54] FUEL INJECTION TYPE THROTTLE VALVE

[75] Inventors: Noboru Watanabe, Susono; Tokuta Inoue, Mishima; Masaki Mitsuyasu, Susono, all of Japan

[73] Assignee: Toyota Jidosha Kogyo Kabushiki Kaisha, Toyota, Japan

[21] Appl. No.: 147,527

[22] Filed: May 7, 1980

Related U.S. Application Data

[63] Continuation of Ser. No. 912,536, Jun. 5, 1978, abandoned.

[30] Foreign Application Priority Data

Apr. 5, 1978 [JP] Japan .................................. 53/42644

[51] Int. Cl.[3] .......................... F16K 19/00; B01F 3/02

[52] U.S. Cl. .................................... 123/478; 137/895; 261/44 A

[58] Field of Search ................ 123/478, 482; 137/604; 261/44 A

[56] References Cited

U.S. PATENT DOCUMENTS

| | | | |
|---|---|---|---|
| 1,611,347 | 12/1926 | Hartwell | 261/44 A X |
| 2,190,314 | 2/1940 | Firth | 261/44 A X |
| 3,842,809 | 10/1974 | King | 123/482 |
| 4,102,952 | 7/1978 | Snipes | 261/44 A |
| 4,105,000 | 8/1978 | Wessel | 261/44 A X |

FOREIGN PATENT DOCUMENTS

| | | | |
|---|---|---|---|
| 742607 | 3/1933 | France | 261/44 A |
| 29834 | of 1911 | United Kingdom | 261/44 A |
| 1443363 | 6/1920 | United Kingdom | 261/44 A |

*Primary Examiner*—Robert G. Nilson

*Attorney, Agent, or Firm*—Stevens, Davis, Miller & Mosher

[57] ABSTRACT

Disclosed is a device for injecting fuel into an intake air supply passage which is communicated with the combustion chambers of an internal combustion engine.

The device comprises: a swingable throttle shaft having a hole formed therein along a longitudinal axis thereof and traversing an intake air supply passage; a throttle valve plate fixed to the throttle shaft for throttling the intake air supply passage so that the throttle valve plate can vary the opening of the air supply passage due to the swing of the throttle shaft; and a fuel injection outlet portion formed at the proximity of the surface of the throttle valve plate and communicated with one of the hole. Fuel supplied from the fuel injection outlet portion is uniformly admixed with the air flow which is caused to contract by the throttle valve plate.

3 Claims, 6 Drawing Figures

FUEL INJECTION TYPE THROTTLE VALVE

This is a continuation of application Ser. No. 912,536 filed June 5, 1978 now abandoned.

BACKGROUND OF THE INVENTION

This invention relates to a device for injecting fuel into an intake air supply passage which is communicated with the combustion chambers of an internal combustion engine.

It is well known to inject fuel by means of a fuel injector into an intake air passage at a position upstream of a throttle valve which is utilized to adjust the flow of an air fuel mixture so that the air fuel mixture can be prepared and supplied to an internal combustion engine. When fuel is injected by means of such a conventional fuel injector, almost all of the injected fuel will adhere onto an internal surface of the intake air supply passage, a so-called throttle bore, and, then, the adhering fuel will flow downwards along the internal surface. Since such downward flowing fuel cannot be readily admixed with the intake air to become atomized and vaporized, the unatomized and unvaporized fuel will often be taken into a combustion chamber through an intake pipe. As a result, according to the above-mentioned conventional injection type fuel supply system, due to the downward flowing of the fuel, the amount of intake fuel, between the engine cylinders and between the working cycles of the engine, may not be uniform, thereby causing difficulties when harmful contaminants contained in the exhaust gas emitted from an engine are reduced and also causing an unstable engine revolution.

SUMMARY OF THE INVENTION

An object of the present invention is to provide a device for injecting fuel into an intake air supply passage for facilitating the fuel to be admixed with the intake air to become atomized and vaporized so that a uniform mixture can be obtained. As a result of such uniform mixture being delivered to the combustion chambers of the engine and, as a result of such mixture being stably burnt in the combustion chambers, the harmful contaminants contained in the exhaust gas emitted from the engine can be reduced. The present invention achieves the above-mentioned object by means of a fuel injection type throttle valve comprising: a swingable throttle shaft having a hole formed therein along a longitudinal axis thereof and traversing an intake air supply passage; a throttle valve plate fixed to the throttle shaft for throttling the intake air supply passage so that the throttle valve plate can vary the opening of the air supply passage due to the swing of the throttle shaft; and a fuel injection outlet portion formed at the proximity of the surface of the throttle valve plate and communicated with one end of the hole, the other end of which, positioned at the entrance of the shaft, is capable of communicating with a fuel measuring device. According to the fuel injection type throttle valve of the present invention, fuel which is measured by means of the fuel measuring device is passed through the hole formed in the swingable throttle shaft and is caused to flow out from the fuel injection outlet portion. Then the fuel which has flowed out is admixed with an air flow, which is, moving by the front end of the throttle valve plate at a high speed, to become atomized and vaporized.

With reference to the accompanying drawings, some embodiments of the present invention will now be explained in detail.

BRIEF DESCRIPTION OF THE DRAWINGS

Referring to FIGS. 1 through 3, the upstream of an intake air supply passage 1 is communicated with an air cleaner (not shown) and the downstream of the intake air supply passage 1 is communicated with the combustion chambers of an engine (not shown). A hollow throttle shaft 3, which has a longitudinal hole 3*a* formed therein, traverses the intake air supply passage 1 and is swingably pivoted via a bearing 5 (FIG. 2) so that the hollow throttle shaft 3 is swung in accordance with changes in the displacement of an accelerator gas pedal (not shown) of a vehicle on which the engine is mounted. The hollow throttle shaft 3 has a disc-shaped throttle valve plate 7 fixed thereon. The throttle valve plate 7 has such an area that the intake air passage 3 is almost closed by the throttle valve plate 7 when the throttle valve plate 7 is positioned in a plane inclined at 10 degrees from a horizontal plane. The shape of the throttle valve plate 7 can be changed to a rectangular shape or to an elongated circular shape in accordance with changes in the shape of the cross-sectional shape of the intake air supply passage 1, when the latter shape is formed in a rectangular shape or in an elongated shape. While the hollow throttle valve 3 is normally located along a diameter of the disc-shaped throttle valve plate 7 as illustrated in FIGS. 1 and 3, in some cases, the thottle shaft 3 may be located along a line located eccentric from a diameter of the throttle valve plate 7.

The throttle shaft 3 has a fuel injection outlet 3*b* formed on a surface thereof facing the upper surface of one half of the throttle valve plate 7, which half is located downwardly when the throttle valve plate 7 is being swung. The fuel injection outlet 3*b* is communicated with the hole 3*a*. The rear end of the throttle shaft 3 is communicated with a fluid measuring device, such as an electromagnetic valve device 11 (FIG. 2), via a flexible tube 9 for supplying fuel. In FIG. 2, the electromagnetic valve device 11 has a valve body 15 which cooperates with a valve seat 13 so that fuel illustrated by the arrow B, supplied from a fuel feed pump (not illustrated) is measured and supplied. A rod 17 connected to the valve body 15 is actuated by an electromagnetic coil 19. The electromagnetic coil 19 is connected to a computer 21 which has an element for effecting an algebraic function disposed therein and which receives signals corresponding to the rotating speed, load and temperture of the engine, and to the temperature of the intake mixture from sensing devices (not shown). The computer 21 transmits to the electromagnetic coil 19 an actuating signal which is obtained after the received signals are modified by means of the above-mentioned element for effecting the algebraic function. The actuating signal comprises a series of pulse signals so that, by changing the width of each pulse signal, the time period of the opening of the valve body 15 is adjusted to a certain time length; then, the flow of the injected fuel can be adjusted in accordance with a desired value. It should be noted that the fuel measuring device of the present invention is not limited to the device illustrated in the accompanying FIG. 2, and the devices (not shown) which are conventionally known can also be utilized. The flexible tube 9 of the present invention can be replaced with a flexible tube (not shown) which is formed in a spiral coil shape.

Referring to FIG. 3, when intake air (arrows C) is supplied through the intake air passage 1 from the air cleaner (not shown) to the combustion chambers (not shown), the air flow inside the air passage is caused to contract by means of the throttle valve plate 7. Consequently, the intake air flows at a high speed through clearances formed between the end portions *7a* and *7b* of the throttle valve plate and the wall of the intake air supply passage 1. The fuel (arrow B), which has been measured by the electromagnetic valve device 11 (FIG. 2), is passed through the hole *3a* of the hollow throttle shaft 3 and flows over the fuel injection outlet *3b*; then, the fuel is injected onto the upper surface of the throttle valve plate 7. The injected fuel flows along the upper surface of the throttle valve plate 7 to the lower end portion *7a*. When the fuel reaches the lower end portion *7a* of the throttle valve plate 7, the fuel is admixed with the intake air flow which is flowing in the proximity of the lower end portion at a high speed to become atomized and vaporized. Accordingly, almost all of the fuel can be prevented from adhering onto the inner wall of the intake air supply passage 1 and can be uniformly admixed with the air to be taken into the combustion chambers (not shown).

A second embodiment of the present invention will now be explained with reference to FIG. 4. In FIG. 4, a throttle valve plate 7 has three fuel guide grooves 8 formed on the upper surface thereof along the radii thereof, which grooves communicate the proximity of the fuel injection outlet *3b* formed on a hollow throttle shaft 3 with positions *7a*, *7b* and *7c* located at the periphery of the throttle valve plate 7. Since the remaining parts of the device illustrated in FIG. 4 are the same as those illustrated in FIGS. 1 through 3, the explanation therefor is accordingly omitted. The fuel injected from the fuel injection outlet *3b* is introduced along the guide grooves 8 to the periphery of the throttle valve plate 7 so that fuel can be prevented from concentrating in one portion. As a result, the fuel is more uniformly admixed with the intake air flow to become atomized and vaporized.

Next, a third embodiment of the present invention will now be explained with reference to FIG. 5. In FIG. 5, the throttle valve plate 7 has a small hole 10 with a suitable cross-sectional shape, such as a circular shape or a rectangular shape, formed therein so that the small hole 10 can communicate the hole *3a* of the hollow throttle shaft 3 with the front end *7a* located at the periphery of the throttle valve plate 7. The opening of the small hole 10 located at the periphery of the throttle valve plate 7 in the third embodiment is the fuel injection outlet portion of the present invention. Since the remaining parts of the device illustrated in FIG. 5 are the same as those illustrated in FIGS. 1 through 3, the explanation therefor is accordingly omitted. The throttle valve device of this embodiment can surely introduce fuel to the front end *7a* of the throttle valve plate 7 regardless of the inclination thereof. The surely introduced fuel can be admixed with the intake air flow to become atomized and vaporized according to admixing processes which are similar to those of the first and second embodiments.

Figure 1:
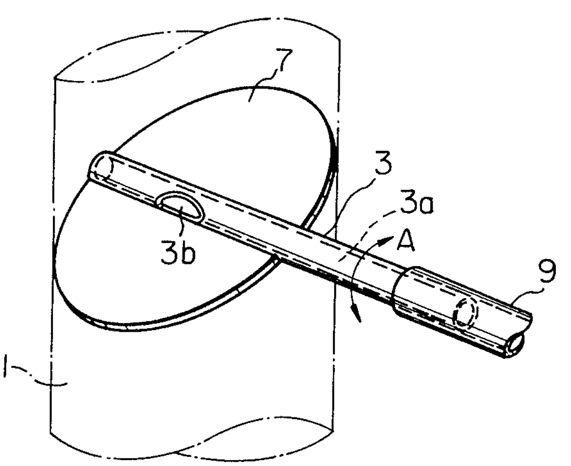
FIG. 1 is a perspective view of a first embodiment according to the present invention.
Figure 2:
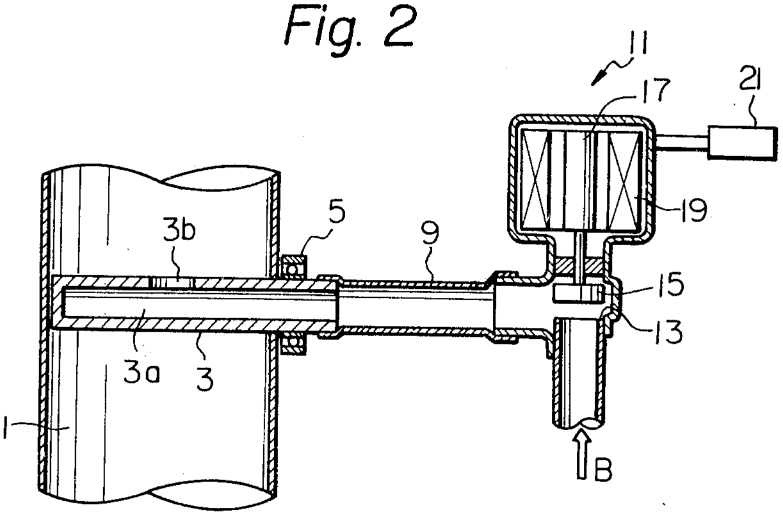
FIG. 2 is a cross-sectional side view of the embodiment illustrated in FIG. 1.
Figure 3:
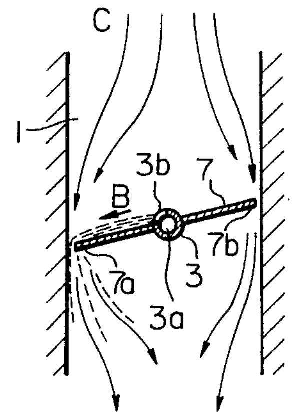
FIG. 3 is a cross-sectional elevational view of the embodiment shown in FIG. 1.
Figure 4:
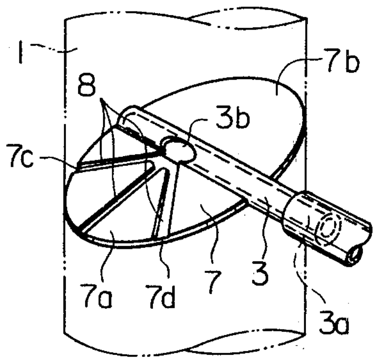
FIGS. 4 through 6 are perspective views of the second through fourth embodiments according to the present invention, respectively.
Figure 5:
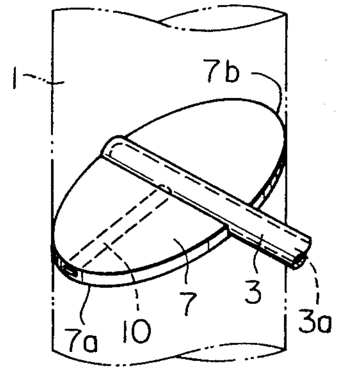
Figure 6:
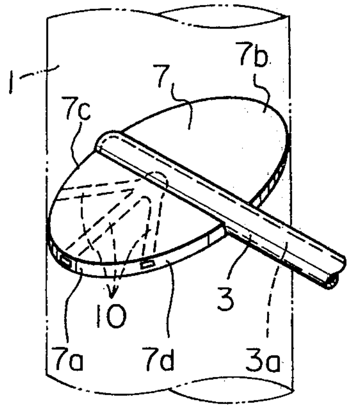

In a fourth embodiment illustrated in FIG. 6, three small holes 10 are radially formed in a throttle valve plate 7 so that the small holes 10 can communicate the hole *3a* of a throttle valve shaft 3 with the openings located at the front ends *7a*, *7b* and *7c* of the throttle valve plate 7. Since the remaining parts of the device illustrated in FIG. 6 are the same as those illustrated in FIGS. 1 through 3, the explanation therefor is accordingly omitted. The device of the fourth embodiment can produce an advantage similar to that produced by the third embodiment wherein fuel can be introduced to the front ends *7a*, *7b* and *7c* of the throttle valve plate 7 regardless of the inclination thereof, as well as produce an advantage similar to that produced by the second embodiment wherein fuel can be prevented from concentrating in one portion.

Utilizing the fuel injection type throttle valve according to the present invention, the adhering and the flowing of the injected fuel along the wall of the intake air passage is reduced. As a result, a uniform mixture can be obtained, and in turn, the non-uniformity of the amount of fuel taken in may be reduced between the engine cylinders and between the working cycles of the engine. Therefore, the mixture can be burnt stably and harmful contaminants contained in the exhaust gas emitted from the engine can be reduced. Since the fuel is fully burnt, the fuel consumption of the engine can be decreased.

What we claim is:

1. A fuel injection device for an engine, said device comprising:

- a fuel injection type throttle valve comprising:
  - an elongated throttle shaft having a longitudinally extending passage for fuel defined therein, said shaft being adapted to traverse an intake air supply passage, said shaft being rotatable about its longitudinal axis;
  - a throttle valve plate fixed to said throttle shaft for throttling the intake air supply passage, said plate being adapted to vary the opening of the air supply passage upon rotation of the throttle shaft;
  - a plurality of outwardly facing fuel outlet openings peripherally spaced from each other in the periphery of the throttle valve plate; and
  - a plurality of connecting passages defined in said valve plate, one end of each of said passages being directly fluidly connected to said fuel passage at substantially the center of said valve plate, extending substantially straight and outwardly therefrom and terminating at a respective one of the fuel outlet openings;
- a fuel supplying means comprising:
  - a valve seat;
  - an electromagnetic valve device having a valve body which cooperates with said valve seat, a rod connected to the valve body, and an electromagnetic coil for moving the rod in an axial direction and thereby moving the valve body relative to the valve seat; and
  - a computer for controlling the electromagnetic valve device in accordance with the rotating speed, load, and temperature of the engine, said computer having an element, for effecting an algebraic function, which receives signals corresponding to the rotating speed, load and temperature of the engine from sensing devices; and a flexible tube directly fluidly interconnecting the fuel supplying means and the throttle shaft.

2. A fuel injection type throttle valve as claimed in claim 1, wherein:

said valve plate is substantially circular;

said openings are circumferentially spaced about the periphery of the plate, and the connecting passages extend radially from substantially the center of the valve plate.

3. A fuel injection type throttle valve as claimed in claim 1 wherein:

said openings are all positioned on the valve plate on the same part thereof to one side of the throttle shaft.

* * * * *

UNITED STATES PATENT AND TRADEMARK OFFICE
CERTIFICATE OF CORRECTION

PATENT NO. : 4,259,935
DATED : April 7, 1981
INVENTOR(S) : Noboru WATANABE, ET AL.

It is certified that error appears in the above-identified patent and that said Letters Patent are hereby corrected as shown below:

Item [30] - Foreign Application Priority Data, should read:

-- Apr. 5, 1978 [JP] Japan ............. 53/43644 --.

Signed and Sealed this

*Sixteenth* Day of *June 1981*

[SEAL]

*Attest:*

RENE D. TEGTMEYER

*Attesting Officer* *Acting Commissioner of Patents and Trademarks*